June 23, 1953   T. B. JOHNSON   2,642,658
CUTTING TOOL FOR CUTTING SHEET METAL
Filed July 26, 1950   2 Sheets-Sheet 2
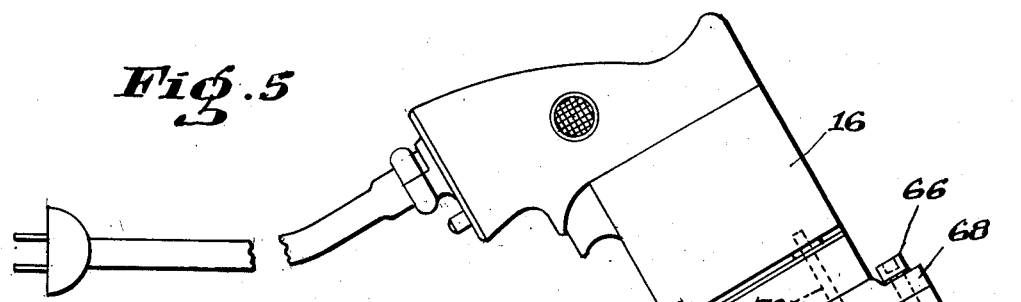
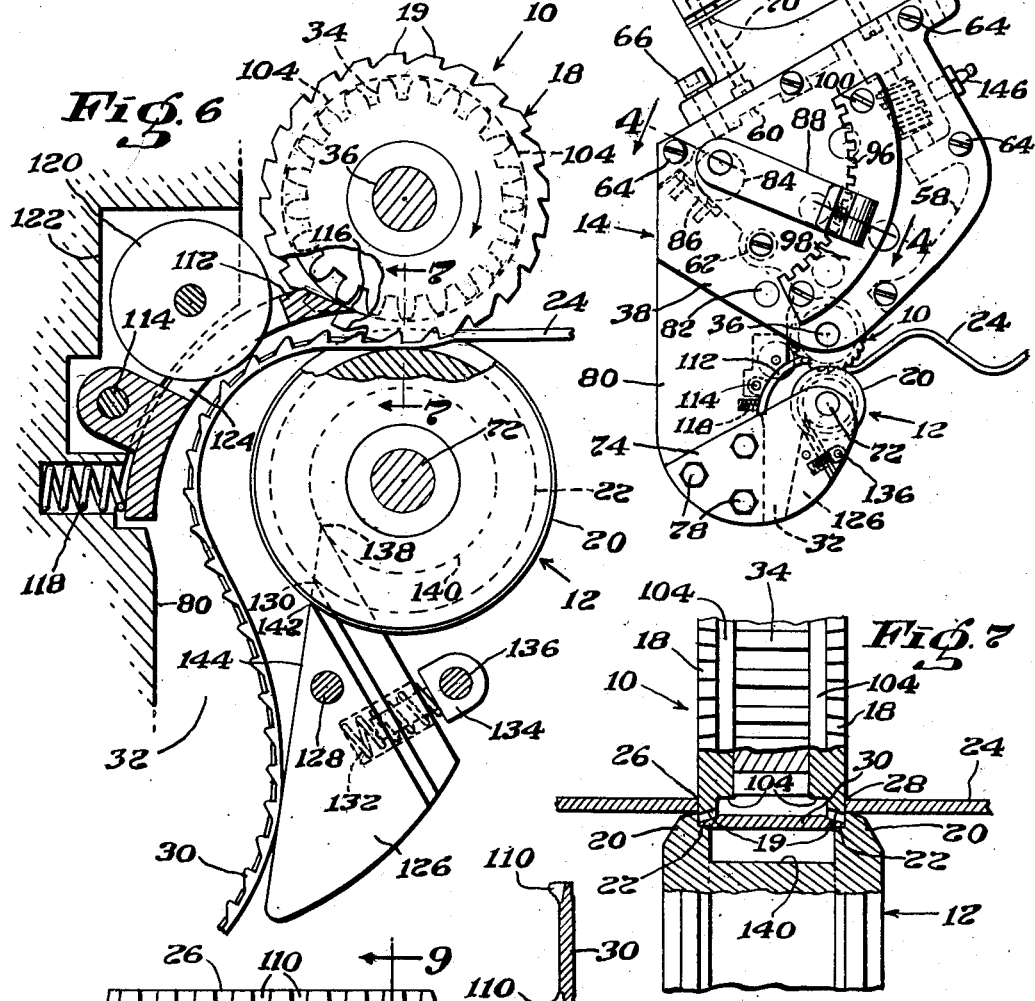
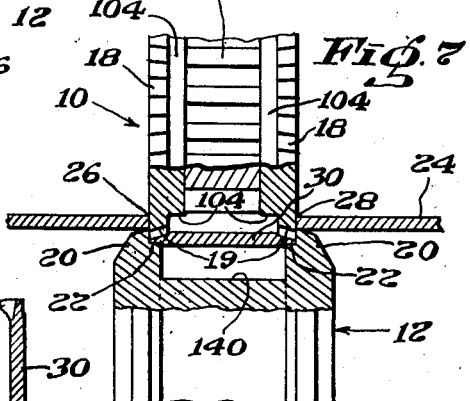
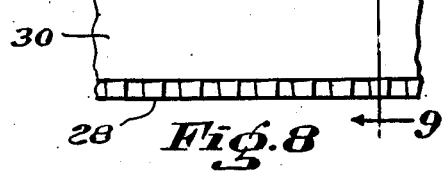
INVENTOR.
THOMAS B. JOHNSON
BY J. Stanley Churchill
ATTORNEY Patented June 23, 1953

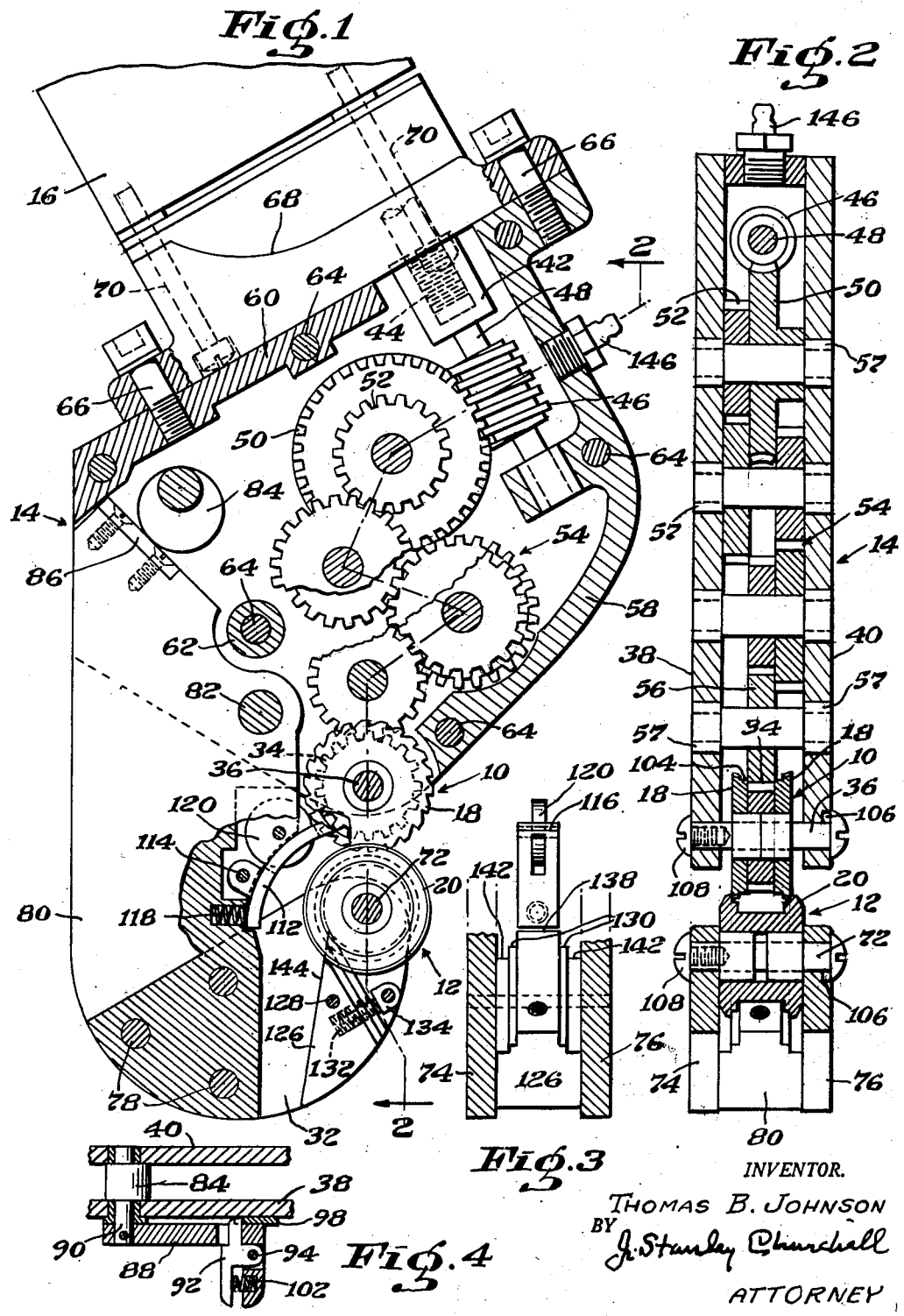

2,642,658

UNITED STATES PATENT OFFICE 2,642,658

CUTTING TOOL FOR CUTTING SHEET METAL

Thomas B. Johnson, Decatur, Ga., assignor to H. H. Robertson Company, Pittsburgh, Pa., a corporation of Pennsylvania Application July 26, 1950, Serial No. 175,929

11 Claims. (Cl. 30—264)

1

This invention relates to a cutting tool for cutting sheet metal.

The invention has for an object to provide a novel and improved portable, power-driven cutting tool particularly adapted among other uses for cutting corrugated sheet metal and which is characterized by novel structure rendering the tool self feeding along the sheet being cut and enabling the tool to perform the cutting operation in a rapid, economical, and superior manner.

With this general object in view, and such others as may hereinafter appear, the invention consists in the cutting tool hereinafter described and particularly defined in the claims at the end of this specification.

In the drawings illustrating the preferred embodiment of the invention, Fig. 1 is a cross-sectional view in side elevation of the present cutting tool; Fig. 2 is a cross-sectional view on the line 2—2 of Fig. 1, the section being taken through the gear centers, as indicated; Fig. 3 is a detail view in front elevation, partly in cross section, of the lower portion of the cutting tool; Fig. 4 is a detail view in cross section taken on the line 4—4 of Fig. 5; Fig. 5 is a side elevation of the present cutting tool; Fig. 6 is an enlarged detail view in side elevation and partly in cross section of the cutting elements and associated mechanism; Fig. 7 is a cross-sectional detail view of the cutting elements as taken on the line 7—7 of Fig. 6; Fig. 8 is a plan view of a strip of metal removed from the sheet by the cutting tool and illustrating the teeth formed in the edges thereof by the cutting elements to effect self-feeding of the tool along the sheet being cut; and Fig. 9 is a cross-sectional view taken on the line 9—9 of Fig. 8.

In general the present invention contemplates a novel construction of portable power-driven cutting tool for shearing sheet metal. The present cutting tool may be used to advantage on flat, irregular-shaped or corrugated metal sheets. Provision is made for enabling the tool to be used to advantage in cutting those protected metal sheets now commonly used for roofing and siding sheets. In its preferred form the present tool embodies a pair of rotary cutting elements, one of which may be power driven, and each of which are preferably provided with two spaced and parallel circular cutting edges by which the metal sheet is cut along two parallel lines forming a strip or band of cut metal between them. Provision is made for deflecting the band thus cut and for effecting self-feeding of the tool along the sheet in a novel, rapid, and superior manner as will be described.

2

Referring now to the drawings, the illustrated cutting tool comprises in general an upper driven rotary duplex cutting unit, indicated generally at 10, and a cooperating lower idling rotary duplex cutting unit, indicated generally at 12, the duplex cutting units being rotatably supported in a frame assembly, indicated generally by the numeral 14, which may be attached to the frame of a commercial portable electric drill 16 of any usual or preferred construction.

The driven rotary cutting unit 10 is provided with two spaced circular cutting disks 18 provided with teeth 19 arranged for cooperation with the circular cutting disks 20 of the lower cutting unit 12 and with bearing shoulders 22 of the lower cutting unit to effect gripping and self-feeding of the tool along the sheet being cut so that in operation when a sheet of metal 24 to be cut is engaged between the duplex cutting units, the sheet is cut along two parallel lines 26, 28 forming a narrow band or strip 30 and leaving an elongated slot or opening through which the portion of the tool immediately behind the cutters may pass as the tool progresses along the sheet being cut. The narrow strip 30 is preferably arranged to be deflected downwardly into and through an opening 32 in the lower portion of the tool, as illustrated in Fig. 1.

The driven cutting unit 10 includes an intermediately disposed gear 34 and is rotatably mounted on a stud 36 detachably secured to and extending between spaced face plates 38, 40 of the frame assembly 14, and is arranged to be rotated by the drill motor through connections including an adapter 42 detachably secured to the spindle 44 of the motor, and a train of reduction gears comprising a worm 46 fast on the adapter shaft 48 arranged to mesh with a worm gear 50 rotatably mounted between the face plates 38, 40. The worm gear 50 is formed integrally with a spur gear 52 which forms one of a train of spur gears indicated generally at 54, the last gear 56 of the train meshing with the gear 34 of the driven cutting unit 10, all of the gears in the train 54 being rotatably mounted in and between the face plates 38 and 40 of the frame assembly and journaled in suitable bearings 57 carried thereby.

As herein illustrated the face plates 38, 40 are secured together in spaced relation by spacing members including a front spacer 58, an upper spacer 60, and an intermediate cylindrical spacer 62, the face plates being connected to the spacers by round head screws 64. The spacers 58, 60 are connected by bolts 66 to an adapter bracket 68 arranged to fit over the head of the electric drill frame, and which in turn is secured to the drill frame by screws 70.

The idling cutting unit 12 is rotatably mounted on a stud 72 detachably secured to and extending between lower face plates 74, 76 which are secured by bolts 78 to opposite sides of a pivotally mounted and adjustable supporting jaw 80. As herein shown, the upper portion of the jaw 80 extends between the upper face plates 38, 40 and is rockingly mounted on a pin 82 journaled in and extending between the upper face plates. Provision is made for adjustably maintaining the lower cutting unit 12 in predetermined axially spaced relation to the upper cutting unit 10 for a particular thickness or gauge of metal to be cut, by mechanism including an eccentric stud 84 journaled in and extending between the face plates 38, 40, the eccentric stud being arranged to engage a hardened plate 86 secured to the pivotally mounted jaw member 80, as shown. Rotation of the eccentric stud 84 may be effected by a lever 88 fast on an extended portion 90 of the stud 84. The outer end of the lever is provided with a latch member 92 pivotally mounted on a pin 94 carried by the lever, the latch being movable into and out of engagement with notches 96 formed in a latch receiver plate 98 secured to the face plate 38 by screws 100. As herein shown, the latch 92 is resiliently maintained in engagement with a notch 96 by a coil spring 102 interposed between an upstanding portion of the lever 88 and an extended portion of the latch, as best shown in Fig. 4. In operation, the latch 92 may be disengaged manually by depressing the coil spring 102. The lever 88 may then be rocked to the desired position of adjustment to present the lower cutting unit in a predetermined axially spaced relation to the upper cutting unit for operation upon a predetermined gauge of sheet metal whereupon the latch 92 may be released.

In operation, the upper cutting disks 18 extend between and in snug engagement with the lower cutting disks 20, as illustrated. The lower unit 12 extends the full width between the face plates 74, 76, and the upper unit 10 being narrower than the space between the face plates 38, 40 is held from lateral displacement by engagement between the circular cutting disks 20 of the lower unit 12 and by the cooperation of the gear 56 extending between shoulders 104 of the upper unit 10 and meshing with the gear 34 thereof. The detachable pins 36, 72 upon which the upper and lower cutting units 10, 12 respectively are mounted, are similar in construction, each being provided with a fin 106 engageable with a slot formed in the face plates to prevent rotation of the stud, and each being provided with a round head retaining screw 108, the heads of which engage the opposed face plates thus providing a quickly and easily detachable mounting for the cutting units. With this construction it will be seen that the upper and lower cutting units may be quickly and easily adjusted for operation upon different thicknesses of metal by adjustment of the lever 88, and that the lever 88 may also be used to effect quick separation of the upper and lower units to enable detachment and replacement of worn cutting units.

Referring now to Figs. 6 to 9, it will be observed that the teeth 19 of the upper rotary cutting disks 18 are shaped to grip and deform the edges of the strip 30 against the shouldered portions 22 of the lower cutting unit in order to effect advancement of the tool along the sheet being cut. The cutting disks 18 are beveled inwardly, as shown, and in the operation of the tool, the sharp edges of the teeth 19 on the upper cutting disks first force the edges of the sheet 24 against the sharp edges of the lower cutting disks 20 making depressions in the sheet which permit the upper disks to hold the sheet as the latter is sheared along the two parallel lines. The strip 30 is then forced down between the sharp cutting edges 20 of the lower cutting unit 12 until the bottom of the strip engages the backup shoulders 22 of the lower unit whereupon the teeth 19 sink themselves deeper into the edges of the strip 30 forcing the metal to be displaced upwardly between the teeth 19, the displaced metal taking the form of gear teeth, as indicated at 110, against which the teeth 19 push to advance the tool along the sheet.

Provision is made for maintaining the cutting units free of foreign matter dislodged from the sheet during the cutting operation, and as shown in Figs. 1, 3, and 6, an arcuate-shaped upper scraper 112 is pivotally mounted on a pin 114 carried by the supporting jaw 80. The upper end of the scraper has a sharp beveled edge 116 arranged to engage between the inner faces of the cutting disks 18 and against the shouldered portions 104 of the upper cutting unit. The scraper 112 is preferably resiliently maintained in engagement with the cutting unit 10 by a coil spring 118 carried in a depressed portion of the jaw 80 and bearing against the lower end of the scraper, as shown. In operation, any foreign matter, such as the protective coating material of the sheet, which may adhere to the disks 18 is scraped off and discharged through the exit opening 32. It will be observed that the parallel beveled cutting edges 19 slope inwardly toward the center of the unit to guide any dislodged foreign matter onto the shoulders 104 where it is picked up by the scraping edge 116 and prevented from entering between the teeth of the gear 34. It will also be observed that the resilient and pivotal mounting of the scraper 112 is adapted to retain the scraping edge 116 in engagement with the shoulders 104 of the cutting unit 10 in any position of pivotal adjustment of the lower unit supporting jaw 80.

Provision is made for deflecting the strip 30 downwardly after it passes between the cutting units 10, 12, and as herein shown, the end of the strip 30 first engages the arcuate surface adjacent the upper end of the scraper 112 and then engages the protruding edge of a guide roller 120 rotatably mounted in a slotted portion 122 of the jaw 80 and extended through a slotted portion 124 of the scraper 112. The engagement of the strip 30 with the freely rotatable roller 120 substantially reduces the frictional resistance against the strip which might otherwise impede the progress of the strip and cause the teeth 19 of the cutting disks 18 to shear the teeth 110 of the strip 30 and thus prevent or retard the self-feeding of the tool along the sheet being cut. The strip 30 is thus directed downwardly through the exit opening 32, and as herein shown, a second scraper 126 pivotally mounted on a pin 128 between the lower face members 74, 76 is provided with opposed intermediate scraping edges 130 arranged to engage the shouldered portions 22 of the lower cutting unit 12 to maintain the same free of any foreign matter which may become dislodged from the sheet being cut. The scraping edges 130 are resiliently held against the shoulders 22 by a coil spring 132 carried in a depressed portion of the scraper 126 and arranged to bear against the flat face of a stud 134 mounted on a pin 136 carried between the lower face plates 74, 76, the stud 134 having a shank portion extended within the coil spring 132, as shown. The scraper 126 is also provided with a central scraping edge 138 which extends close to but does not engage the central reduced diameter portion 140 between the shoulders 22 of the lower unit. The scraper 126 is also provided with outer scraping edges 142 which likewise extend close to but do not touch the cutting edges 20 of the lower unit whereby to maintain the respective surfaces free of foreign matter. The inner surface 144 of the scraper 126, which defines an inner wall of the exit opening 32, also serves to guide the strip downwardly away from the lower unit 12 and to remove the strip from between the edges of the cutting disks 20 in the event that the strip is retained therebetween after passing beyond the cutting units.

Lubrication may be provided in the form of a heavy gear grease introduced through the grease fitting 146 into the gear chamber between the face plates 38, 40. In practice, some of the grease may work out gradually around the upper cutting unit and onto the lower cutting unit which serves to prevent corrosion of the cutting units and also to prevent the asphalt or other protective covering material on the sheets being cut from adhering to the cutting disks.

From the above description it will be seen that the present portable, power-driven, and self-feeding cutting tool may be employed to cut flat, corrugated, or other irregularly shaped metal sheets in a rapid and efficient manner and provides a smooth sheared edge without distorting or bending the sheet being cut. In the operation of the cutting tool, when cutting corrugated sheet metal, the tool is manipulated by the operator to cause the tool to roll up and down over the corrugations, preferably with the tool held so that a line passing through the center of the upper and lower rotary cutting units is maintained at substantially 90 degrees to the portion of the sheet being cut. As herein illustrated, an intermediate portion of the supporting jaw 80, immediately in back of the cutting units 10, 12 is preferably of a reduced thickness to permit this portion to pass through the slot or opening formed by removal of the strip 30. The supporting jaw 80 is reduced in thickness throughout a triangular portion thereof, defined by the lower edges of the face plates 38, 40, the upper edges of the lower face plates 74, 76, and the rear wall of the jaw, to permit rocking of the tool up and down during the cutting of corrugated sheets, transversely of the corrugations, either at right angles to the corrugations, or at angular deviations from a line at right angles to the corrugations for cutting mitered portions or the like. Thus, in operation, when traveling through an upwardly inclined portion of a corrugation, the tool is held so that the plane of the sheet is substantially parallel to the lower edges of the upper face plates 38, 40, and when traveling down an inclined portion of the corrugation, the tool is rocked so that the plane of the sheet is substantially parallel to the upper edges of the lower face plates 74, 76. The rotary cutting disks 18, 20 are preferably of a diameter relative to the corrugations that the cut is made without deforming or distorting the corrugations, and in practice, the tool may be modified with respect to the diameter of the cutting disks and also with respect to the angle defined by the triangular-shaped reduced thickness portion of the supporting jaw 80 to accommodate metal sheets having corrugations or irregularities of different proportions.

While the preferred embodiment of the invention has been herein illustrated and described, it will be understood that the invention may be embodied in other forms within the scope of the following claims.

Having thus described the invention, what is claimed is:

1. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of inwardly beveled teeth arranged to pierce the metal and force the same against and between the idling cutting disks to perform the cutting operation, said idling cutting disks having relatively narrow shouldered portions adjacent the inner faces thereof for cooperation with said teeth to grip and deform the metal along the marginal edges of the strip forming tooth-like projections thereon against which the teeth of the driven disks engage to effect self-feeding of the tool along the sheet being cut, and means including a roller disposed immediately behind the cutting units for deflecting said strip out of the path of the tool as the same is advanced during the cutting operation.

2. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having shouldered portions adjacent the inner faces thereof for cooperation with said teeth to grip and deform the metal along the marginal edges of the strip and effect self-feeding of the tool along the sheet being cut, and scraping means including an upper scraper and a lower scraper engageable with portions of said driven and idling cutting units respectively for maintaining the same free of foreign matter dislodged from the sheet being cut.

3. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having relatively narrow shouldered portions adjacent the inner faces thereof for cooperation with said teeth to grip and deform the metal along the marginal edges of the strip and effect self-feeding of the tool along the sheet being cut, means including a roller for deflecting said strip out of the path of the tool as the latter is advanced during the cutting operation, and scraping means including an upper scraper and a lower scraper engageable with portions of said cutting units for maintaining the same free of foreign matter dislodged from the sheet being cut.

4. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, and scraping means including a lower pivotally and resiliently mounted scraping element engageable with portions of said lower cutting unit for maintaining the same free of foreign matter dislodged from the sheet during the cutting operation.

5. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having relatively narrow shouldered portions adjacent the inner faces thereof for cooperation with said teeth to grip and deform the metal along the marginal edges of the strip and effect self-feeding of the tool along the sheet being cut, and a pivotally and resiliently mounted arcuate-shaped scraper engageable between said driven cutting disks for maintaining the same free of foreign matter dislodged from the sheet being cut.

6. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having relatively narrow shouldered portions adjacent the inner faces thereof for cooperation with said teeth to grip and deform the metal along the marginal edges of the strip and effect self-feeding of the tool along the sheet being cut, and a pivotally and resiliently mounted arcuate-shaped scraper engageable between said driven cutting disks for maintaining the same free of foreign matter dislodged from the sheet being cut, said arcuate-shaped scraper being disposed to initially engage the end of said strip to start downward deflection thereof, and a freely rotatable roller mounted to project beyond the arcuate face of said scraper and to subsequently engage said strip to effect downward deflection thereof with minimum resistance to the self-feeding advancement of the tool.

7. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having relatively narrow shouldered portions adjacent the inner faces thereof for cooperation with said teeth to grip and deform the metal along the marginal edges of the strip and effect self-feeding of the tool along the sheet being cut, means including a roller for deflecting said strip downwardly out of the path of the tool as the latter is advanced during the cutting operation, and a pivotally and resiliently mounted scraper engageable with said relatively narrow shouldered portions and between the cutting disks of the idling cutting unit for maintaining the same free of foreign matter dislodged from the sheet being cut.

8. A tool for cutting sheet metal comprising a driven rotary cutting unit and a cooperating idling cutting unit, each cutting unit having a pair of spaced and parallel cutting disks cooperatively arranged to cut a strip of metal out of the sheet forming an opening through which the tool may pass, the driven cutting disks having a plurality of teeth and the idling cutting disks having relatively narrow shouldered portions adjacent the inner faces thereof for cooperation with said teeth to grip and deform the metal along the marginal edges of the strip and effect self-feeding of the tool along the sheet being cut, means including a roller for deflecting said strip downwardly out of the path of the tool as the latter is advanced during the cutting operation, and a pivotally and resiliently mounted scraper engageable with said relatively narrow shouldered portions and between the cutting disks of the idling cutting unit for maintaining the same free of foreign matter dislodged from the sheet being cut, said scraper being disposed to guide the downwardly deflected strip and to free the strip from between said idling cutting disks in the event the strip should become jammed therebetween during the cutting operation.

9. A tool for cutting sheet metal comprising a driven rotary cutting unit and a cooperating idling cutting unit, each cutting unit having a pair of spaced and parallel cutting disks cooperatively arranged to cut a strip of metal out of the sheet to form an opening through which the tool may pass, the driven cutting disks having a plurality of inwardly beveled teeth arranged to pierce the metal and force the same against and between the idling cutting disks to perform the cutting operation, said idling disks having relatively narrow shouldered portions adjacent the inner faces thereof for cooperation with said inwardly beveled teeth to grip and displace the metal along the marginal edges of the strip and forming tooth-like projections thereon against which the teeth of the driven disks engage to effect positive self-feeding of the tool along the sheet being cut.

10. A portable, power-driven tool for cutting corrugated and other metal sheets comprising a frame, an upper rotary cutting unit mounted in said frame, a supporting arm carried by said frame, a cooperating lower rotary cutting unit mounted in said supporting arm, each of said cutting units having a pair of spaced and parallel cutting disks cooperatively arranged to cut a strip of metal out of the sheet to form an opening through which the tool may pass, said supporting arm being pivotally carried by said frame, and means including an eccentric stud carried by said frame and engageable with said arm for pivotally adjusting the arm to vary the axial distance between said cutting units, and latch means for locking said arm in its adjusted position.

11. A portable, power-driven tool for cutting corrugated and other metal sheets comprising a frame, an upper rotary cutting unit mounted in said frame, a supporting arm carried by said frame, a cooperating lower rotary cutting unit mounted in said supporting arm, each of said cutting units having a pair of spaced and parallel cutting disks cooperatively arranged to cut a strip of metal out of the sheet to form an opening through which the tool may pass, the upper cutting disks having a plurality of inwardly beveled teeth arranged to pierce the metal and force the same against and between the idling cutting disks to perform the cutting operation, said lower cutting disks having relatively narrow shouldered portions adjacent the inner faces thereof for cooperation with said teeth to grip and deform the metal along the marginal edges of said strip forming tooth-like projections thereon against which the teeth of the driven disks engage to effect self-feeding of the tool along the sheet being cut, said supporting arm being reduced in thickness throughout an area to permit the tool to pass through said opening and to provide angular clearance to permit rocking of the tool up and down the corrugations of a corrugated metal sheet to prevent bending or distortion of the corrugations during the cutting operation.

THOMAS B. JOHNSON.

References Cited in the file of this patent

UNITED STATES PATENTS

| Number | Name | Date |
| --- | --- | --- |
| 1,229,120 | Montgomery | June 5, 1917 |
| 2,042,097 | Havanas | May 26, 1936 |